(12) United States Patent
Korolainen et al.

(10) Patent No.: US 8,192,189 B2
(45) Date of Patent: Jun. 5, 2012

(54) ARRANGEMENT AND METHOD IN CONNECTION WITH EXTRUSION TOOLS

(75) Inventors: Eero Korolainen, Espoo (FI); Matti Sistola, Helsinki (FI)

(73) Assignee: Maillefer S.A., Ecublens (CH)

( * ) Notice: Subject to any disclaimer, the term of this patent is extended or adjusted under 35 U.S.C. 154(b) by 798 days.

(21) Appl. No.: 12/325,079

(22) Filed: Nov. 28, 2008

(65) Prior Publication Data

US 2009/0238908 A1 Sep. 24, 2009

(30) Foreign Application Priority Data

Dec. 10, 2007 (FI) ..................................... 20075890

(51) Int. Cl.
*B29C 41/30* (2006.01)
(52) U.S. Cl. ..................................... 425/113; 425/133.1
(58) Field of Classification Search .................. 425/463, 425/113, 133.1; 427/118
See application file for complete search history.

(56) References Cited

U.S. PATENT DOCUMENTS

| | | | |
|---|---|---|---|
| 3,277,225 A * | 10/1966 | Heard, Jr. .................. | 264/171.18 |
| 3,694,131 A | 9/1972 | Stuart | |
| 4,525,131 A * | 6/1985 | Hauser, Jr. .................. | 425/114 |
| 4,883,690 A * | 11/1989 | Carter .................. | 427/430.1 |
| 5,127,361 A * | 7/1992 | Matsuda et al. .................. | 118/405 |
| 5,667,818 A * | 9/1997 | Guillemette .................. | 425/133.1 |
| 6,827,568 B2 | 12/2004 | Harlin et al. | |
| 2008/0038392 A1* | 2/2008 | Druet et al. .................. | 425/113 |

FOREIGN PATENT DOCUMENTS

| | | |
|---|---|---|
| JP | A-59-29141 | 2/1984 |
| NL | 7707320 A | 1/1978 |
| WO | WO 03/023791 A1 | 3/2003 |

* cited by examiner

*Primary Examiner* — Joseph Del Sole
*Assistant Examiner* — Ryan Ochylski
(74) *Attorney, Agent, or Firm* — Oliff & Berridge, PLC

(57) ABSTRACT

The invention relates to an arrangement in connection with extrusion tools. It comprises a nozzle structure which is provided with coaxially arranged nozzle elements (1, 2, 3, 4) and is arranged to form one or more layers which cover a flexible elongated element (6) on the surface of the flexible elongated element (3), which passes through the innermost nozzle element (4), and a guide member (5) corresponding the diameter of the elongated element (6) for controlling the flexible elongated element (6). The guide member (5) is arranged to be pushed in the direction of the elongated element (6) into its position inside the two innermost nozzle elements (3, 4) defining a first melt channel (7). The guide member (5) is arranged to provide a tapered space (52) between the elongated element (6) and the guide member (5), and the tapered space (52) is in fluid communication with the first melt channel (7).

15 Claims, 1 Drawing Sheet

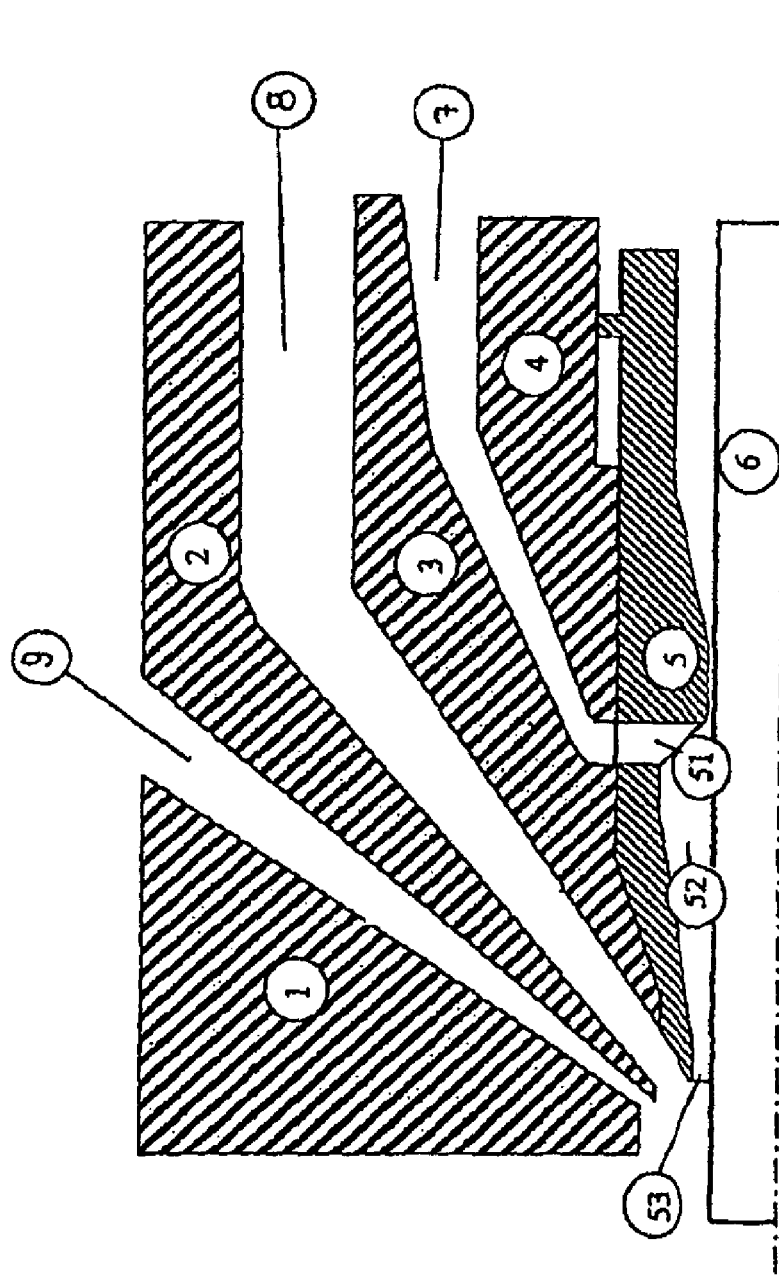

ARRANGEMENT AND METHOD IN CONNECTION WITH EXTRUSION TOOLS

FIELD OF THE INVENTION

The present invention relates to an arrangement according to the preamble of claim 1 and particularly to an arrangement in connection with extrusion tools. It comprises a nozzle structure which is provided with coaxially arranged nozzle elements and is arranged to form one or more layers which cover a flexible elongated element on the surface of the flexible elongated element, which passes through the innermost nozzle element, and a guide member corresponding to the diameter of the elongated element for controlling the flexible elongated element, the guide member being a separate unit arranged to be pushed in the direction of the elongated element into its position at least partly inside the two innermost nozzle elements defining a first melt channel.

BACKGROUND OF THE INVENTION

The invention relates to an arrangement in connection with extrusion tools, which comprises a nozzle structure consisting of axially arranged nozzle elements. The nozzle elements are arranged to form one or more layers covering a flexible elongated element on the surface of the flexible elongated element, which passes through the innermost nozzle element. The head section of the innermost nozzle or a separate guide member is used for controlling the flexible elongated element as it is passed through the nozzle structure. During manufacturing cables or the like elongated elements, one or more layers of material are provided over the cable or the like by extrusion tools. When the cable type, for example the diameter of a cable, to be manufactured is changed, the nozzle structure of the extrusion tool needs to be altered to be suitable for the diameter of the new cable type. A prior art solution for altering the nozzle structure is put forward in U.S. Pat. No. 6,827,568. In this solution the nozzle is provided with a separate guide member that may be changed according to the type of cable to be manufactured. The joint between the guide member and a nozzle element of the nozzle structure is arranged to be loosened by repulsive force acting on the unit in the direction of the flexible elongated element. The guide member is arranged to exit the nozzle structure in the direction of the flexible elongated element.

The drawback of the prior art is that in order to avoid back flow of molten material during tool change, the extrusion tool cannot utilize pressure type extrusion, but must be of tube or semi-tube type. As a consequence, adhesion of material to the conductor and filling of the space between the strands is unsatisfactory. Furthermore, the extrusion tool has to rely on gripping elements to hold the guide member in place. Thus the operation of the gripping mechanism under production conditions cannot always be guaranteed, resulting in a reduced reliability of the process, with, as a consequence, significant downtime and loss of productivity.

BRIEF DESCRIPTION OF THE INVENTION

An object of the present invention is thus to provide an arrangement so as to overcome the above disadvantages of the prior art. The objects of the invention are achieved by an arrangement according to the characterizing portion of claim 1 which is characterized in that the guide member is arranged to provide a tapered space between the elongated element and the guide member, and that the tapered space is in fluid communication with the first melt channel for extruding a material onto the elongated element through the tapered space in a manner of pressure tooling.

The preferred embodiments of the invention are disclosed in the dependent claims.

The invention is based on the idea that the guide member is formed to provide a tapered space between the elongated element to be produced and the guide member corresponding to the diameter of the elongated element to be produced such that the innermost layer of extrudable material may be extruded on the elongated element through pressure type tooling. The guide member may also be provided with annular openings to provide a fluid communication between the innermost melt channel and the tapered space such that extrudable molten material may be supplied to the tapered space from the innermost melt channel. The guide member may also be splittable such that it may be installed into its position and uninstalled without stopping the extrusion process.

Thus, the advantage of the present invention is that the tapered space allows the innermost material layer provided on the elongated element to be pressed against the elongated element during the extrusion. In other words an innermost polymer layer may applied on a conductor with a pressure type extrusion tool. Additionally the arrangement of the present invention also provides a solution where backflow of molten material is prevented during changing the guide member. The pressure type extrusion tool provides better adhesion of extruded material on an elongated element, or a conductor, and enhances filling of the space between strands. Furthermore it provides a reliable, simple and effective way for altering the nozzle structure and specifically the guide means as the type of the cable or the like to be produced is changed.

BRIEF DESCRIPTION OF THE DRAWING

In the following, the invention will be described in greater detail by means of preferred embodiments with reference to the accompanying drawing, in which the FIGURE is a schematic partial cross sectional view of a nozzle structure of an extrusion tool according to the present invention.

DETAILED DESCRIPTION OF THE INVENTION

The FIGURE is a schematic view of a nozzle structure of an extrusion tool and specifically the die (nozzle) part of an extruder head. The nozzle structure comprises several coaxially arranged nozzle elements 1, 2, 3, 4. The nozzle elements comprise an extrusion die 1, a first intermediate die 2, a second intermediate die 3 and a die holder 4. A first melt channel 7 is provided between the die holder 4 and the second intermediate die 3, in other words the innermost nozzle element 4 and the next outermost nozzle element 3 define the innermost melt channel 7 between them. A second melt channel 8 is provided between the second intermediate die 3 and the first intermediate die 2, in other words the second innermost nozzle element 3 and the third innermost nozzle element 2 define the second innermost melt channel 8. A third melt channel 9 is provided between the first intermediate die 2 and the extrusion die 1, in other words the third innermost nozzle element 2 and the fourth innermost nozzle element 1 define the third innermost melt channel 9.

The nozzle structure further comprises a separate guide member 5 that may be installed inside nozzle structure. In the FIGURE, the guide member 5 is installed inside the die holder 4 and the second intermediate die 3. The guide member 5 is installed wholly or at least partly inside the two innermost nozzle elements, but it may also be installed inside three or more innermost nozzle elements. The guide member 5 may be installed by pushing it against the die holder 4 and the second intermediate die 3 or it may be engaged to the die holder 4 and/or the second intermediate die 3 by gripping means for attaching it to both or one of them detachably. According to the above, the guide member 5 is a separate part introduced into the nozzle structure.

When the guide member 5 is installed over an elongated element 6 it substantially surrounds the elongated element 6. The guide member 5 is formed such that it may be separated into two or more pieces for removing it and/or installing it over the elongated element 6. Preferably the guide member 5 is splittable in axial direction into two halves. When the guide member 5 is installed over the elongated element, it may be inserted into the extrusion head over a flexible elongated element 6 already introduced in the extrusion head. The guide member 5 may be arranged to be pushed into its position inside the nozzle structure by positioning means, such as adequate mechanical means. Alternatively the guide member 5 is installed over the elongated element 6 such that it is loosely attached to the elongated element 6. Then the guide member 5 may be carried forward into its position along with movement of the flexible elongated element 6 passing through the nozzle structure. The splittable configuration of the guide member 5 allows the guide member also to be removed over the elongated element 6. Then the removable guide member 5 may be retracted from the nozzle structure by discharge means, such as an adequate mechanical means, separated in two halves and be removed from the extrusion head without need to stop the extrusion line. The above configuration of the guide member 5 allows it to be installed into and to be uninstalled from the extrusion head without need to stop the extrusion line and the movement of the elongated element 6. During manufacture, the diameter, size or type of the elongated element 6 is changed every now and then in which case a elongated element is connected to the end of the elongated element 6 presently running through the extrusion head. As the diameter of the elongated element 6 changes also the guide member 5 has to be changed such that it corresponds the diameter of the new elongated element. The changing of the guide member may be done as described above. According to this configuration there is no restriction as to the sequence of elongated element sizes; a large diameter can follow a small diameter and vice versa.

The guide member 5 is formed such that it closely corresponds to the diameter of the elongated element 6 such that it may control the elongated element 6 passing through the nozzles structure of the extrusion head. According to the FIGURE, the guide member 5 disposed inside the innermost nozzle element 4 and the next outermost nozzle element 3. However it should be appreciated that the guide member 5 be disposed in some other position inside the nozzle structure. As the guide member 5 extends inside the innermost nozzle element 4 and the next outermost nozzle element 3, it also extends over the first melt channel 7. In order to extrude material from the first melt channel 7, a fluid communication between the first melt channel 7 and the elongated element is provided. The mentioned fluid communication is provided by a radial opening or hole 51 formed in the guide member 5. In other words, the guide member 5 is provided with one or more radial holes 51 for enabling the material from the first melt channel 7 to be extruded on the elongated element 6, as the guide member 5 extends over this first melt channel 7 inside the nozzle structure. When the guide member 5 is disposed in its position inside the nozzle structure, the radial holes are aligned with the first melt channel 7 such that the material supplied from the first melt channel 7 may flow through the radial holes 51 in the guide member and further on the elongated element 6. Thus the radial holes 51 in the guide member allow the guide member 5 to extend inside both the innermost nozzle element 4 and the next outermost nozzle element 3 without preventing the material from the first melt channel 7 to be extruded on the elongated element 6.

The guide member 5 is further formed to provide a tapered space 52 between the elongated element 6 and the guide member 5. As shown in the FIGURE, the tapered space 52 extends between the first melt channel 7 and the second melt channel 8. Furthermore the tapered space 52 is in fluid communication with the first melt channel 7. The fluid communication between the first melt channel 7 and the tapered space 52 is provided by the radial holes 51 formed in the guide member 5 such that the material from the first melt channel 7 flows through the radial holes 51 to the tapered space 52 between the elongated element 6 and the guide member. Therefore the tapered space 52 is provided downstream of the first melt channel 7. The tapered space 52 causes the material extruded from the first melt channel 7 to be pressed against the elongated element 6 passing through the nozzle structure. Accordingly, the extrudable material flows from the first flow channel 7 through the radial holes 51 in the guide member 5 into the tapered space 52 and exits from the tapered space 52 from exit 53 providing an innermost material layer onto the elongated element 6. The middle material layer is extruded from the second melt channel 8 onto the innermost material layer and the outermost material layer is extruded on the middle material layer from the third melt channel 9, respectively.

The tapered space 52 presses the extrudable material from the first melt channel 7 against the elongated element 6 such that innermost material layer may be extruded on the elongated element 6 in the manner of pressure tooling. This provides better adhesion of the innermost material layer to the elongated element 6 enhancing the properties of the final product. When the elongated element 6 is changed to a new elongated element having different size and/or diameter, the guide member 5 is also changed so that the new guide member corresponds to the size of the new elongated element. This allows elongated elements with different diameters to be produced without stopping the production line and at the same time a pressure type tooling may be used to form the innermost material layer on the elongated elements of different sizes.

The guide member 5 is further formed such that the part of the guide member upstream of the radial holes 51 corresponds closely the diameter of the elongated element serving as the actual guide for the elongated element running through the nozzle structure. When the guide member 5 is removed from the extrusion head, the innermost layer is extruded onto the flexible elongated element 6 in the manner of tube tooling in the same way as the outer layers, as may be seen from the FIGURE. Thus backflow of material during change of the guide member 5 is avoided.

The present invention may be used in a extrusion head or nozzle structure configured for extruding one or more layers of material onto the elongated as it is passed through the nozzle structure. Furthermore the sequence of elongated elements or cables is not restricted, but a elongated element with large diameter can follow a small diameter and vice versa.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement in connection with extrusion tools, which comprises a nozzle structure which is provided with coaxially arranged nozzle elements and coaxially arranged melt channels between the nozzle elements, said nozzle elements and melt channels being arranged to form one or more layers which cover a flexible elongated element on the surface of the flexible elongated element, which passes through the innermost nozzle element, and a guide member corresponding to the diameter of the elongated element for controlling the flexible elongated element, the guide member being a separate unit arranged to be pushed in the direction of the elongated element into its position at least partly inside the two innermost nozzle elements defining a first melt channel, wherein the guide member is arranged to provide a tapered space between the elongated element and the guide member, and that the tapered space is in fluid communication with the first melt channel for extruding a material onto the elongated element through the tapered space in the manner of a pressure tooling.

2. An arrangement according to claim 1, wherein the guide member is provided with one or more radial openings to provide fluid communication between the first melt channel and the tapered space.

3. An arrangement according to claim 1, wherein the tapered space extends and tapers in the direction of the elongated element.

4. An arrangement according to claim 1, wherein the tapered space surrounds radially the elongated element.

5. An arrangement according to claim 1, wherein the nozzle head comprises a second melt channel downstream of the first melt channel, and that the tapered space extends between the first and second melt channels.

6. An arrangement according to claim 1, wherein the guide member is loosely attached to the elongated element.

7. An arrangement according to claim 6, wherein the guide member is arranged to be carried forward into its position along with the movement of the flexible elongated element passing through the nozzle structure.

8. An arrangement according to claim 1, wherein the guide member is arranged to be pushed into its position inside the nozzle structure by positioning means.

9. An arrangement according to claim 1, wherein the guide member is arranged to be retracted from its position inside the nozzle structure by a discharge means.

10. An arrangement according to claim 1, wherein the guide member is a part that can be split for mounting and/or demounting over a flexible elongated element.

11. An arrangement according to claim 1, wherein the guide member is at least the head of the innermost nozzle element, or the guide member is at least the head of the innermost nozzle element and the next outermost nozzle element.

12. An arrangement according to claim 1, wherein the guide member is a separate part disposed at least partially inside the innermost nozzle element or at least partly inside the innermost and the next outermost nozzle element.

13. An arrangement according to claim 1, wherein the guide member is placed inside the nozzle structure in advance.

14. An arrangement according to claim 2, wherein the tapered space surrounds radially the elongated element.

15. An arrangement according to claim 3, wherein the tapered space surrounds radially the elongated element.

\* \* \* \* \*